(12) United States Patent
Watkins (10) Patent No.: US 8,251,394 B2
(45) Date of Patent: Aug. 28, 2012

(54) LOW RIDER SADDLE MOUNT

(75) Inventor: Doyle E. Watkins, Canton, MI (US)

(73) Assignee: Wastow Enterprises, LLC, Britton, MI (US)

( * ) Notice: Subject to any disclaimer, the term of this patent is extended or adjusted under 35 U.S.C. 154(b) by 8 days.

(21) Appl. No.: 12/865,012

(22) PCT Filed: Jan. 28, 2009

(86) PCT No.: PCT/US2009/032188
§ 371 (c)(1),
(2), (4) Date: Jul. 28, 2010

(87) PCT Pub. No.: WO2009/097307
PCT Pub. Date: Aug. 6, 2009

(65) Prior Publication Data
US 2010/0320726 A1 Dec. 23, 2010

Related U.S. Application Data

(60) Provisional application No. 61/024,078, filed on Jan. 28, 2008.

(51) Int. Cl.
*B60P 3/06* (2006.01)
*B62D 53/00* (2006.01)

(52) U.S. Cl. ..... 280/402; 280/403; 280/408; 280/476.1; 280/656

(58) Field of Classification Search ............... 280/292, 280/408, 402, 403, 476.1, 491.1, 491.3, 656
See application file for complete search history.

(56) References Cited

U.S. PATENT DOCUMENTS

| | | | |
|---|---|---|---|
| 4,119,328 A | 10/1978 | Rhodes | |
| 4,949,985 A | 8/1990 | Lichter | |
| 5,391,044 A * | 2/1995 | Young | 414/563 |
| 5,566,964 A * | 10/1996 | Leonard | 280/417.1 |
| 5,722,677 A * | 3/1998 | Lichter et al. | 280/402 |
| 5,873,593 A * | 2/1999 | Gesuale | 280/411.1 |
| 6,497,541 B2 | 12/2002 | Pawluk | |
| 7,017,934 B2 * | 3/2006 | Harris | 280/476.1 |
| 7,422,225 B2 * | 9/2008 | Troha et al. | 280/403 |
| 7,789,411 B2 | 9/2010 | Schuettenberg | |
| 2008/0036176 A1 | 2/2008 | Schuettenberg | |

FOREIGN PATENT DOCUMENTS
WO WO2007146666 12/2007
* cited by examiner

*Primary Examiner* — Lesley D Morris
*Assistant Examiner* — Marc Scharich
(74) *Attorney, Agent, or Firm* — Fraser Clemens Martin & Miller LLC; Jacob M. Ward (57) ABSTRACT

A system including a low rider saddle mount (302) for safe and legal transportation of multiple vehicles (136, 137) is provided. The system includes a low rider saddle mount (302) having a first horizontal member (304) selectively coupled to one of a towing vehicle (132) and a second vehicle (136), and a second horizontal member (306) selectively coupled to one of the second vehicle (136) and a third vehicle (137). The second horizontal member (306) is vertically spaced apart from the first horizontal member (304). The multiple vehicles (136, 137) are towed in a forward direction. The system may further include a universal folding boom trailer (130). A method for towing multiple vehicles (136, 137) is also provided.

9 Claims, 10 Drawing Sheets

LOW RIDER SADDLE MOUNT

CROSS REFERENCE TO RELATED APPLICATION

This application claims the benefit of U.S. Provisional Application Ser. No. 61/024,078 filed on Jan. 28, 2008, the entire disclosure of which is hereby incorporated herein by reference.

FIELD OF THE INVENTION

The present disclosure relates generally to a method and apparatus for transporting and delivering multiple trucks, and in particular, to a low rider saddle mount for loading, transporting and delivering trucks in compliance with the Department of Transportation Regulations.

BACKGROUND OF THE INVENTION

Semi tractor trucks, also known as "semi trailer trucks", are typically delivered in groups of two or more. Generally, a truck that is being towed is mounted by a saddle mount on top of the frame or on the fifth wheel of another truck. Undesirably, the exhaust stacks and air fairings of the trucks conventionally delivered by decking occasionally have to be removed to keep the trucks under the legal height, and to allow the trucks to pass under bridges and through tunnels.

Figure 1:
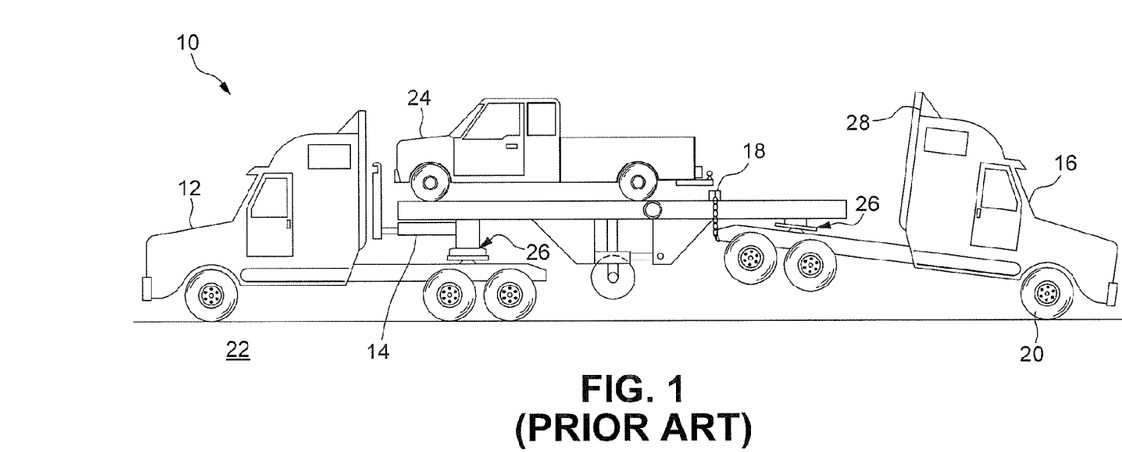
FIG. 1 illustrates the typical towing method of the prior art.

FIG. 1 illustrates a known method of towing semi tractor trucks 10. This current method of towing provides delivery of two semi tractor trucks at a time. A towing semi tractor truck 12 typically faces forward and tows a boom trailer 14. A towed semi tractor truck 16 is connected to the boom trailer 14 at a fifth wheel connection 26. A support chain 18 is further used to hold the angle of the towed semi tractor truck 16. The boom trailer 14 is also connected to a fifth wheel connection 26 of the towing semi tractor truck 12. The towed semi tractor truck 16 is towed facing backwards with only steering tires 20 on the ground 22. The steering tires 20 are generally held in a straight position on the towed semi tractor truck 16 by securing the steering wheel with the driver's seat belt. The driver's personal pickup truck 24 is transported on top of the boom trailer 14 between the towing and towed semi tractor trucks 12, 16 (the loading ramps are not shown).

In the abovementioned arrangement, the majority of the weight of the pick up truck 24 is behind a fifth wheel 26 of the towing semi tractor truck 12. The majority of the weight of the boom trailer 14 is also behind the fifth wheel 26. Therefore, the majority of the weight of the driver's personal pickup truck 24 and the boom trailer 14 is supported by the steering tires 20. The steering tires 20 also support the entire towed semi tractor truck 16 while being towed backwards. However, the use of steering tires 20 alone to support the towed semi tractor truck 16, for example, without employment of the tag axle tires, is dangerous and illegal. The towed semi tractor truck 16 also has wind deflection panels 28 that may undesirably act like a parachute, creating drag and may even be torn off by the wind if not removed or secured before towing begins.

There is a continuing need for a system and method for allowing trucks to pass under bridges and through tunnels without having to remove stacks or wind fairings. Desirably, trucks having the system will be legal to tow and deliver throughout the United States and other countries.

SUMMARY OF THE INVENTION

In concordance with the instant disclosure, a system and method allowing trucks to pass under bridges and through tunnels without having to remove stacks or air fairings, and allowing the trucks having the system to be legal to tow and deliver throughout the United States and other countries, is surprisingly discovered.

In a first embodiment, a system for towing multiple vehicles includes a low rider saddle mount disposed between at least one of a towing vehicle and a second vehicle, and the second vehicle and a third vehicle. The low rider saddle mount has a first horizontal member selectively coupled to one of the towing vehicle and the second vehicle and a second horizontal member selectively coupled to one of the second vehicle and the third vehicle. The second horizontal member is vertically spaced apart from the first horizontal member. The vehicles are each towed in a forward direction. The system may further include a universal folding boom trailer having a rotatable boom for supporting an optional first vehicle and the second vehicle upon the boom trailer. The universal folding boom trailer further includes a first means for securing the universal folding boom trailer to the towing vehicle.

In another embodiment, a method for towing multiple vehicles includes the steps of: providing a low rider saddle mount having a first horizontal member and a second horizontal member, the second horizontal member vertically spaced apart from the first horizontal member; securing the first horizontal member to one of a towing vehicle and a second vehicle; loading one of a second vehicle and a third vehicle atop the second horizontal member of the low rider saddle mount in a forward facing position; and securing the second horizontal member of the low rider saddle mount to one of the second vehicle and the third vehicle.

The low rider saddle mount of the present disclosure may be used exclusively with the universal folding boom trailer or alone, for towing multiple trucks without exceeding known legal height requirements.

DRAWINGS

The above, as well as other advantages of the present disclosure, will become readily apparent to those skilled in the art from the following detailed description, particularly when considered in the light of the drawings described herein.

FIGS. 8 a-d illustrate a bell crank of the universal folding boom trailer according to the present disclosure;

FIGS. 10 a-b illustrate a rigid low rider saddle mount for use with the universal folding boom trailer shown in FIGS. 2 to 8, the rigid low rider saddle mount pivoting from a fifth wheel of a truck;

FIGS. 11 a-b illustrate an adjustable height low rider saddle mount for use with the universal folding boom trailer shown in FIGS. 2 to 8 the adjustable height low rider saddle mount pivoting from an axle anchor of a truck;

FIGS. 13 a-b illustrate a low rider saddle mount according to another embodiment of the disclosure, the low rider saddle mount attached to the rear of the truck frame and having a separate attachment bar for ease in assembly.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, are not necessary or critical.

With reference to FIGS. 2 to 8, a universal folding boom trailer 130 for use with the system and method of the present disclosure is shown. The universal folding boom trailer 130 is further described in International Application No. PCT/US2007/070406 to Watkins, the entire disclosure of which is hereby incorporated herein by reference.

Figure 2:
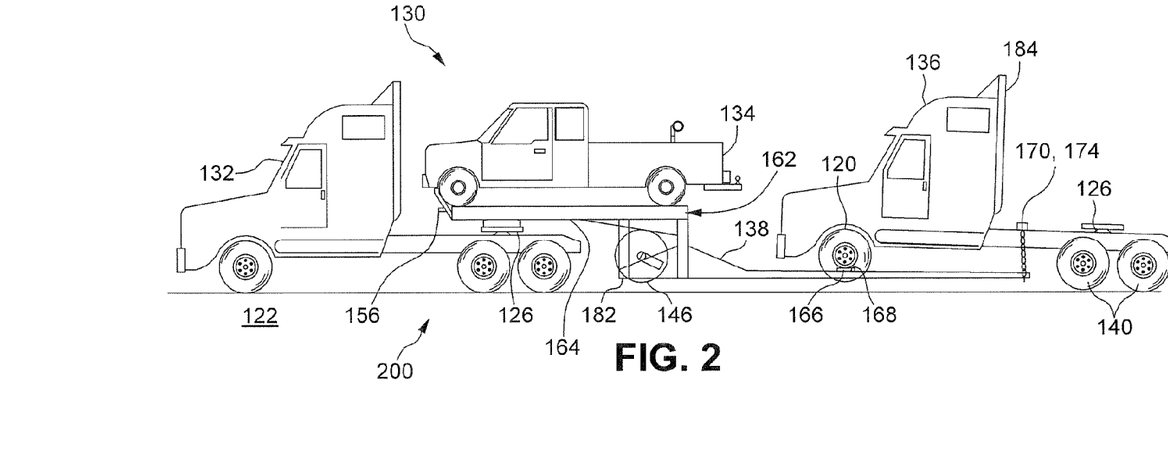
FIG. 2 illustrates a universal folding boom trailer according to the present disclosure.

As shown in FIG. 2, the universal folding boom trailer 130 includes a rotatable boom 138 for supporting multiple vehicles 134, 136 upon the universal folding boom trailer 130. The universal folding boom trailer 130 is configured for transport of the multiple vehicles 134, 136 by a towing vehicle 132, such as a semi tractor truck. The multiple vehicles 134, 136 may include a first vehicle 134 such as a driver's personal vehicle and a second vehicle 136 such as a semi tractor truck, for example. The driver's personal vehicle may be optionally towed or not towed, as desired. Alternatively, the second vehicle 136 may be any type of desired vehicle, including a box truck, a flatbed, and a straight truck, for example. The multiple vehicles 134, 136 are towed in a forward direction.

Figure 3:
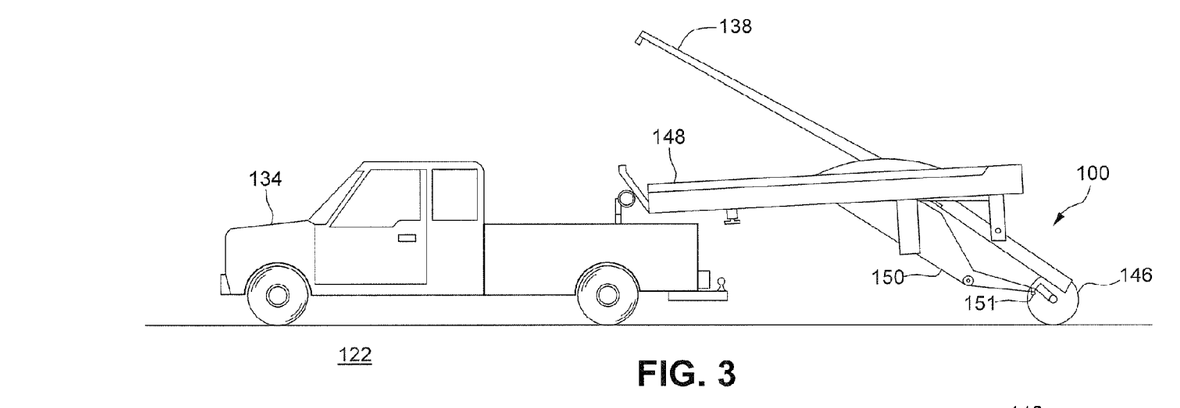
FIG. 3 illustrates a side view of the universal folding boom trailer depicted in FIG. 2, further shown in a folded position.
Figure 4:
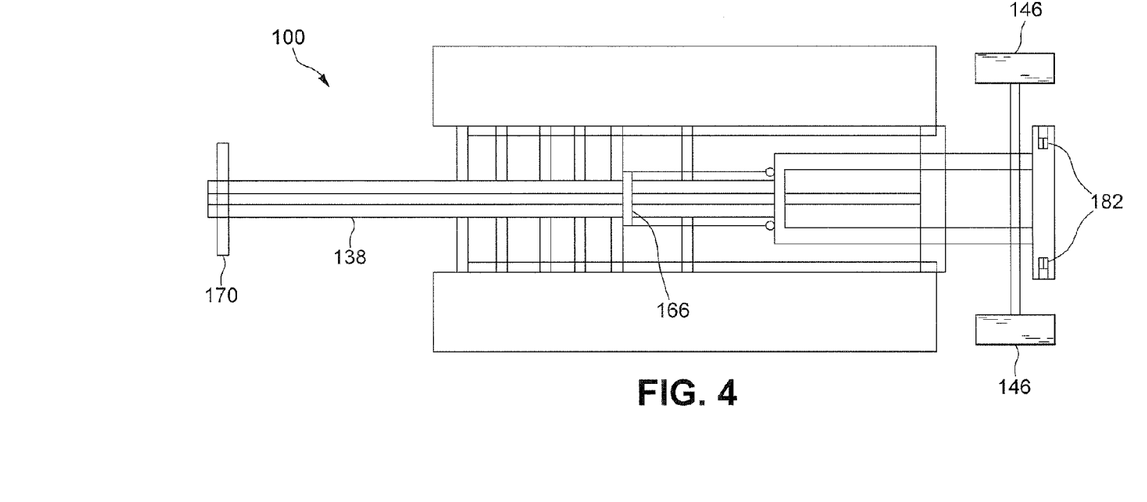
FIG. 4 is a top view of the universal folding boom trailer as shown in FIGS. 2 and 3.
Figure 7:
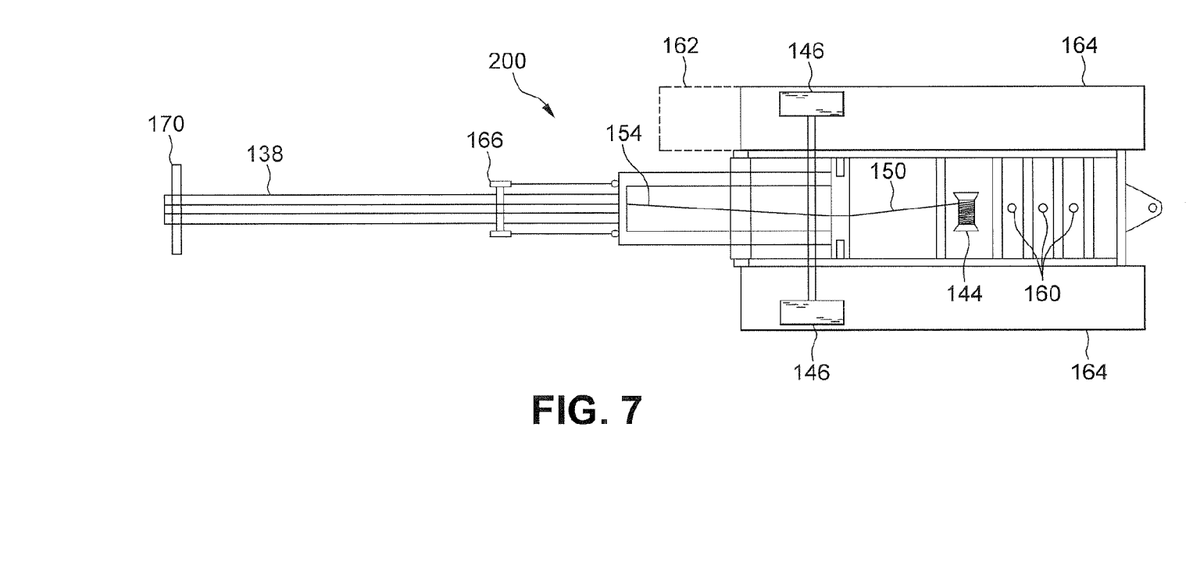
FIG. 7 illustrates a top view of the universal folding boom trailer as shown in FIG. 6.
Figure 8A:
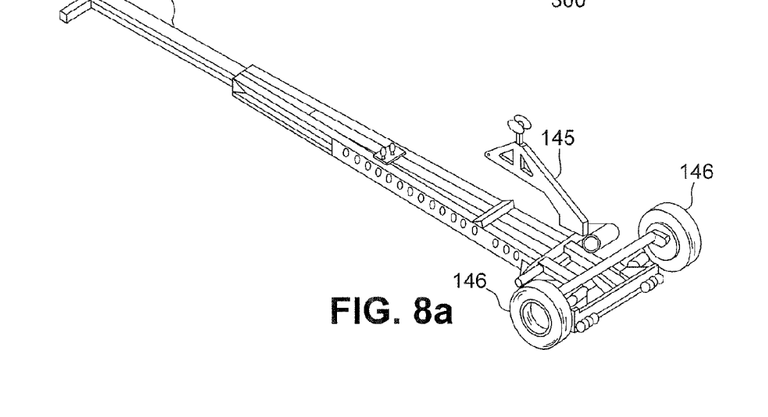
Figure 8B:
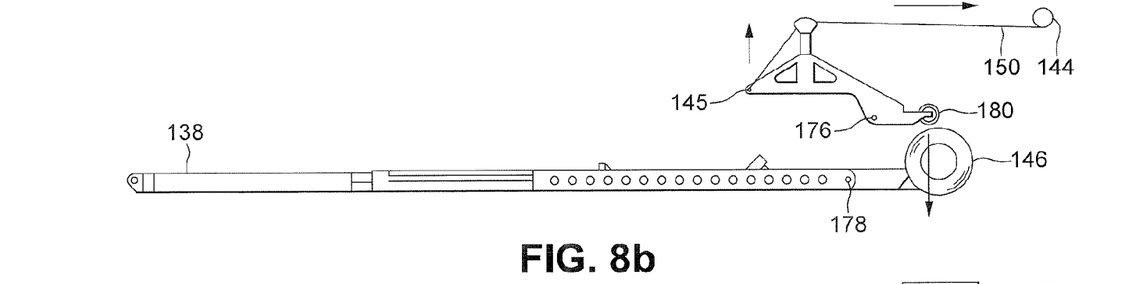
Figure 8C:
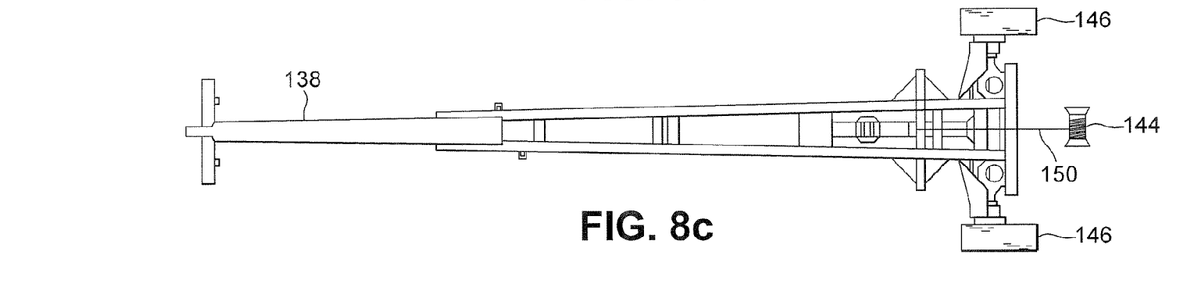
Figure 8D:
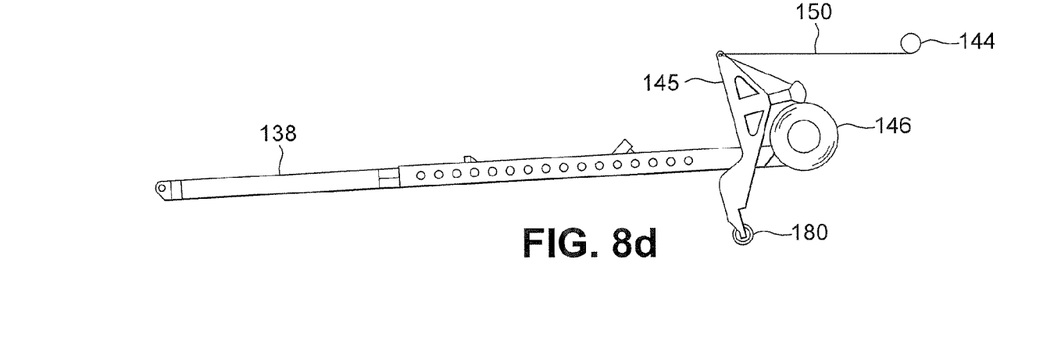

The boom 138 is rotatable from a folded position 100 as shown in FIGS. 3 and 4 for trailering to an unfolded position 200 as shown in FIG. 2. In the unfolded position 200, the universal folding boom trailer 130 is configured for transportation of the multiple vehicles 134, 136. The boom 138 includes a winch 144, for example, as shown in FIG. 7, for rotating the boom 138 between the folded position 100 and the unfolded position 200. The boom 138 in the unfolded position 200 further includes a position lock 182 for securing the boom 138 in the unfolded position 200. When in the unfolded position 200, the universal folding boom trailer 130 forms a solitary trailer that may back up like a conventional trailer when attached to the first vehicle 132.

Figure 5:
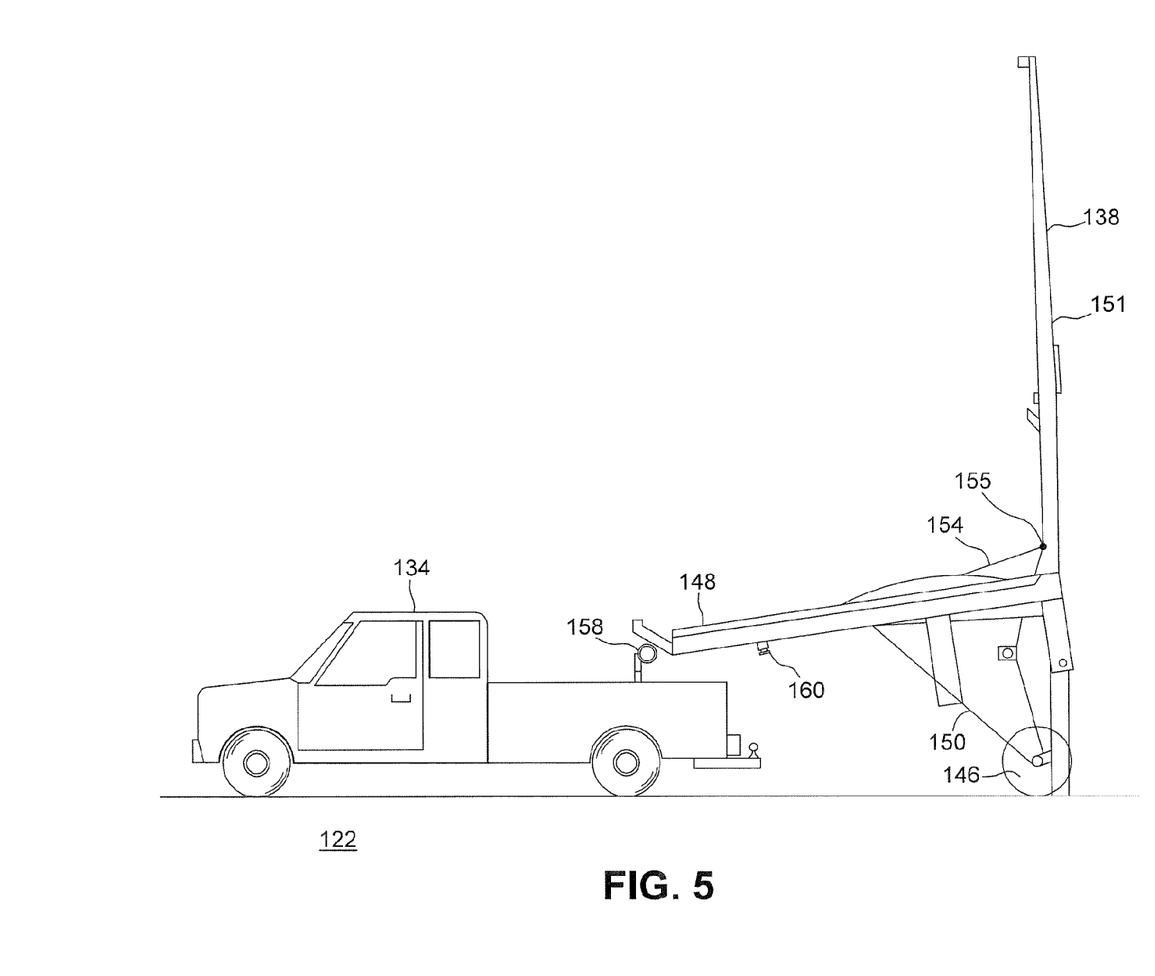
FIG. 5 illustrates a side view of the universal folding boom trailer shown in FIGS. 2 to 4, with the universal folding boom trailer in a vertical position.

Referring to FIG. 5, the universal folding boom trailer 130 also includes a first means for securing 160 the universal folding boom trailer 130 to the first vehicle 134, for example, for towing the universal folding boom trailer 130. As a non-limiting example, the first means for securing 160 may include a multi-position king pin for towing by the first vehicle 134. A second means for securing 158 the universal folding boom trailer 130 to another vehicle, such as by coupling the universal folding boom trailer 130 with the fifth wheel 126 of the towing vehicle 132, may also be provided.

Figure 9:
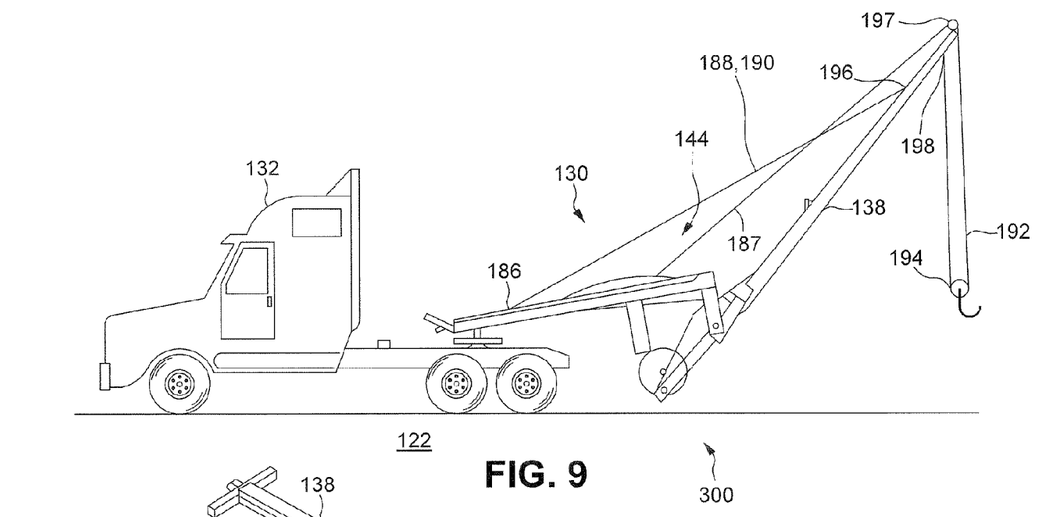
FIG. 9 illustrates a second embodiment of the universal folding boom trailer performing a hoisting operation.

Additionally, the universal folding boom trailer 130 may be used as a crane. As illustrated in FIG. 9, the boom 138 is rotatable to a crane position 300 and is used in conjunction with the winch 144 for moving the first and second vehicles 134, 136, for example, by lowering the first and second vehicles 134, 136 from their respective forward towing positions. Alternatively, the crane position 300 provides a means for connecting at least an additional third vehicle 137 to the second vehicle 136 (shown in FIGS. 10b and 11b) for towing in a forward facing position.

The present disclosure also includes a method for towing multiple vehicles, wherein each of the first, second, and third vehicles 134, 136, 137 is towed while facing forward. The method includes the steps of: providing the universal folding boom trailer 130 having the rotatable boom 138; rotating the boom 138 to the unfolded position 200; locking the boom 138 in the unfolded position; securing the boom 138 to the towing vehicle 132; loading the first personal vehicle 134 for towing atop the universal folding boom trailer 130 in the forward facing position 200; and loading the second vehicle 136 for towing atop the boom 138 in a forward facing position.

The universal folding boom trailer 130 may also form the solitary trailer as described hereinabove. The formation of the solitary trailer for ease in transporting the universal folding boom trailer 130 includes the steps of rotating the boom 138 to a desired position by a winch 144, and backing up the universal folding boom trailer 130 to the first vehicle 134, such as the driver's personal vehicle, like a conventional trailer.

The method of the present disclosure may further include the step of loading one or more additional third vehicles 137 onto the second vehicle 136 in a forward towing position until the maximum legal towing length is reached. The step of loading the third vehicle 137 may be performed before or after loading the first and second 134, 136 vehicles for towing. In a particular embodiment, the universal folding boom trailer 130 may be employed to connect the second and third vehicles 136, 137 prior to loading the first vehicle 134 onto the universal folding boom trailer 130 and securing the universal folding boom trailer 130 to the second vehicle 136.

To unload the towed vehicles 134, 136, 137, the method may include the steps of: driving the towed second vehicle 136 and the towed third vehicle 137 away from the universal folding boom trailer 130; unloading the towing vehicle 132 from the universal folding boom trailer 130; rotating the boom 138 of the universal folding boom trailer 130 into the crane position 300; and disconnecting the vehicles 136, 137 by hoisting the vehicles 136 about the boom 138 via the winch 144.

The universal folding boom trailer 130 may be trailered from either end and in any position, as desired. In a specific embodiment, the universal folding boom trailer 130 may be trailered when the boom 138 is in the folded position 100 or in the unfolded position 200. The universal folding boom trailer 130 may also be trailered when the towed vehicles 134, 136 are loaded or unloaded, as desired.

As illustratively shown in FIGS. 3 and 4, the universal folding boom trailer 130 may be towed by the personal first vehicle 134 in the folded position 100 to a desired destination. The boom 138 is unfolded by operating a winch 144 (FIG. 7). The winch 144 pulls the transport tires 146 towards the front 148 of the universal folding boom trailer 130 until the boom 138 is positioned straight up (FIG. 5). The wire cable 150 may be attached (FIG. 3) at an attachment point 151 along the boom 138, for example. At this point, the winch 144 is reversed and the boom 138 continues to rotate in the same direction while being prevented from falling by wire cable 154 (FIG. 5) until the boom 138 lays flat on the ground 122 (see side and top views FIGS. 6 and 7, respectively). The wire cable 154 may be located at an attachment point 155 on the boom 134, for example.

Figure 6:
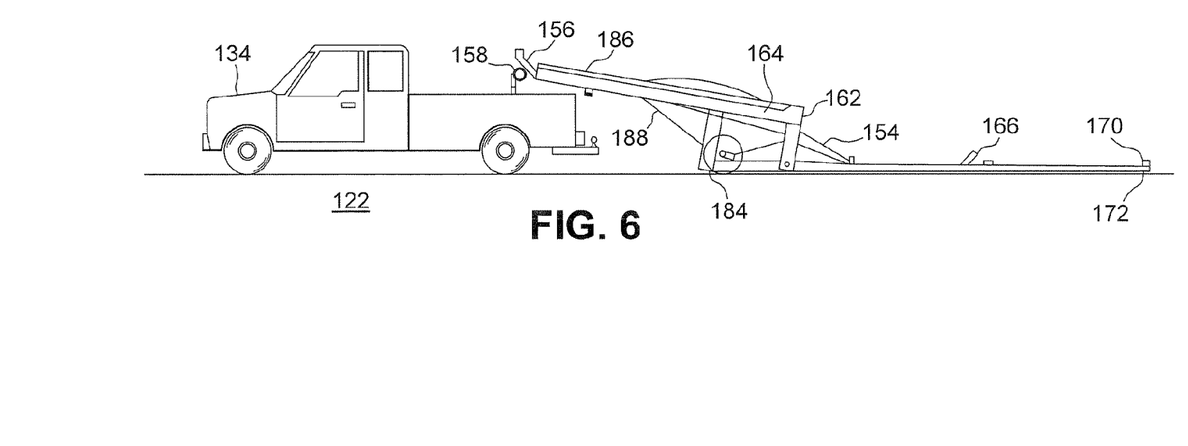
FIG. 6 illustrates a side view of the universal folding boom trailer with the boom in an extended position.

Following the placement of the universal folding boom trailer 130 in the unfolded position 200, the boom trailer hitch 156 is then disconnected from the fifth wheel 158 (FIG. 6). The winch 144 is reversed again, lifting the boom trailer hitch 156 up and away from the second means for securing 158 on the back of the first vehicle 134 as a result of the boom 138 being heavier than the front 148. The first vehicle 134 can then be driven forward and out from underneath the universal folding boom trailer 130. The towing vehicle 132 is then backed underneath the front of the universal folding boom trailer 130 and the first means for securing 160, such as the multi-position kingpin 160, is locked into the fifth wheel 126 of the towing vehicle 132 (FIGS. 2 and 6). The multi-position kingpin 160 is provided with multiple coupling positions to accommodate the various hauling conditions.

The first vehicle 134 is loaded onto the universal folding boom trailer 130 by loading ramps 162 that easily slide out from the universal folding boom trailer 130 when needed, as is well known in the art. The loading ramps 162 are extended from underneath the pickup truck support rails 164 (FIGS. 2 and 7). In a particular embodiment, the ramps 162 are made of 3 inch channel overlaid with expanded metal or subway grating. The first vehicle 134 is secured by chains and binders (not shown), as is well known in the art. The loading ramps 162 are then slid back into their original position underneath the support rails 164.

The second vehicle 136, such as the semi tractor truck, is then driven over and straddles the boom 138 that is lying on the ground 122 (FIGS. 2, 6 and 7). The second vehicle 136 is driven forward to a front axle connector 166. The second vehicle axle 168 is secured to the boom 138 by the front axle connector 166. A frame connector 170 is connected to the frame of the second vehicle 136 at an attachment point 172 and secured by chains 174. The attachment point 172 is adjustable and slides forward and aft for hauling various lengths of trucks.

With reference to FIGS. 8a to 8d, the winch 144 becomes functional after the second vehicle 136 is secured by removing a locking pin 176 from its attachment point 178 along the boom 138 to a lifting arm 145 of the winch 144 assembly. The removal of the locking pin 176 allows the winch 144 to rotate when the cable 150 is retracted. The rotation applies a ground roller 180, such as heavy duty dolly wheels, to the ground surface 122. The rotation raises the front end of the second vehicle 136 and the back of the first vehicle 134 simultaneously by lifting the middle section of the universal folding boom trailer 130 upward. When the boom 138 becomes level, the first vehicle 134 becomes level and the steering tires 120 of the second vehicle 136 raise off the ground 122. As a nonlimiting example, the steering tires 120 may be lifted approximately 9 inches off of the ground 122 and are, therefore, no longer in use.

In certain embodiments, the universal folding boom trailer 130 is made from aluminum, steel, fiberglass or any combination of materials capable of performing the described method of operation. When using steel, the main frame of the universal folding boom trailer 130 may be constructed of 2×8×3/16 rectangular steel tubing, and the folding portion of the boom 138 may be made with 8 inch "I" beams, for example. When using steel or other weldable materials, the universal folding boom trailer 130 is of all welded construction. While the winch 144 has been described using mechanical means with an electric winch, other means such as hydraulics or pneumatics may be used.

With reference to FIG. 9, the universal folding boom trailer 130 is shown in the crane position 300 by fixedly attaching to the towing vehicle 132, for example, at the fifth wheel connection 126. To form the crane position 300, the universal folding boom trailer 130 is equipped with additional cables 187, 192 for use in conjunction with a snatch block 194. Initially, the universal folding boom trailer 130 may be laid on the ground 122 in the unfolded position 200 (FIG. 2). Boom support cables 188, 190, 192 are extended from a first end 186 of the universal folding boom trailer 130 to the forward end 196 of the boom 138. The boom 138 is retracted toward the folded position 100 via the winch 144. During retraction, the boom 138 is stopped at a point where the cable 187 is detachable from the winch 144 and may be strung over a transfer pulley 197 for connection with the cable 192. The cable 192 wraps around the snatch block 194 for attachment to the boom 138, for example, at an attachment point 198. The universal folding boom trailer 130 is thereby able to perform any desired hoisting operation.

It should be understood that the universal folding boom trailer 130 of the present disclosure legally and safely tows the second vehicle 136 while also transporting the first vehicle 134, such as the driver's personal pickup truck. The universal folding boom trailer 130 is not limited to the towing of only semi tractor trucks 136 because a fifth wheel connection 126 is not necessary on the towed second vehicle 136. Since the towed second vehicle 136 is towed facing forward, the universal folding boom trailer 130 can also tow either a box truck, a flatbed truck, or a straight or semi tractor truck (as shown).

With the system and method of the present disclosure, the majority of the weight of a boom 138 and the first vehicle 134 is supported by dual wheeled axles 140 of the second vehicle 136 being towed forward. A further advantage of supporting the weight on the rear axles is that the dual wheeled axles 140 are non-steering and have a much higher weight bearing capacity in comparison to the steering tires 120. A still further advantage of the universal folding boom trailer 130 is that the steering tires 120 of the towed truck 136 are elevated above the road and free of any weight bearing loads. The elevated location militates against a need to immobilize the steering wheel with the driver seat belt. Since the second vehicle 136 is being towed forward with the weight on the rear tires, there are also more tires on the ground 122 for increased braking effect. Consequently, the towed truck 136 is less apt to have a blowout, minimizing the opportunity for changing lanes and colliding with a passing vehicle. The universal folding boom trailer 130 may also be converted to the crane position 300, using a winch 144 for loading and unloading towing vehicles in a piggy back configuration.

The safety issues of the prior art method illustrated in FIG. 1 are also corrected by the use of the universal folding boom trailer 130 shown in FIGS. 2 to 8. The universal folding boom trailer 130 is approximately 150% lighter than known trailers, making the universal folding boom trailer 130 easier to tow and stop. The lower weight contributes to greater fuel savings and less wear and tear on the first vehicle 134. Since there is no hydraulics involved in the operation of the universal folding boom trailer 130, the opportunity for hydraulic fluid leaks is eliminated.

Further, the air deflection panels 28 (FIG. 1) on the towed truck 16 act like a parachute under conventional towing methods. The air deflection panels 28 create drag and may even be torn off by the wind if not secured before towing begins with the conventional methods. With the universal folding boom trailer 130 and method of the present disclosure, the truck 136 is towed forward and the air travels around the wind deflection panels 184 in the intended direction, eliminating any need to secure the panels 184. The universal folding boom trailer 130 thereby decreases drag and increases fuel efficiency during transport of the first and second vehicles 134, 136.

A still further advantage of the universal folding boom trailer 130 over the known trailer systems is elimination of the need for a light bar to be added to the front of the truck 16 being towed backwards in FIG. 1. Under conventional towing methods, the light bar must be added to provide operating brake lights, turn signals, hazard lights and marker lights. Since the second vehicle 136 in FIG. 2 is towed facing forward when using the universal folding boom trailer 130 of the present disclosure, the existing lights on the back of the towed second vehicle 136 are used, thereby militating against the need for a light bar. It should be appreciated that the light bar may also be rendered unnecessary by the towing of the one or more additional third vehicles 137 facing forward.

The universal folding boom trailer 130 further provides a forward center of gravity of the forward facing towed second vehicle 136. The forward center of gravity creates a more stable towing environment by limiting the chance of jack knifing during hard braking or other emergency situations. One of ordinary skill in the art should also appreciate that the universal folding boom trailer 130 may be used as a crane to hoist vehicles, such as transport trucks, primarily for decking or cab and chassis transport. Alternatively, the universal folding boom trailer 130 may be used as a crane to hoist vehicles, such as transport trucks, for deck removal from a vehicle 136 after unhitching the towed second vehicle 136 from the universal folding boom trailer 130. The crane may also be used for any other hoisting needs, as desired.

In a particular embodiment, the boom trailer position lock 182 may be inserted on both sides of the boom trailer 138 to make the entire structure rigid, as if a one piece unit. The winch 144 may then be rotated back to the original position, raising the ground rollers 180 off of the ground 122. The first and second vehicles 134, 136 are now ready for transport by the towing vehicle 132. With this rigid configuration, it should be appreciated that the universal folding boom trailer 130 is capable of backing up like a conventional trailer.

It is surprisingly found that the universal folding boom trailer 130, when bringing the second vehicle 136 down so that the steering tires 120 are approximately 9 inches from the ground, instead of the 3 or 4 feet off the ground as in the known methods, allows the second vehicle 136 to be delivered in the forward facing position and lower to the ground 122. Advantageously, the universal folding boom trailer 130 facilitates the passing of the second vehicle 136 under bridges and through tunnels without having to remove stacks or air fairings.

Figure 10A:
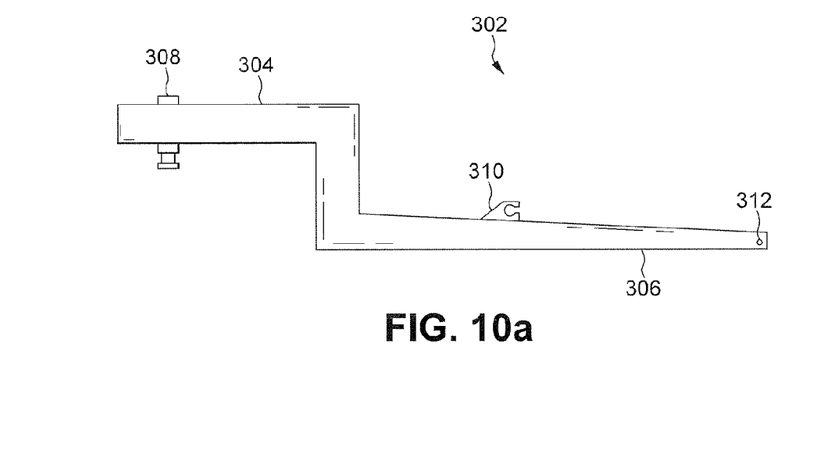
Figure 10B:
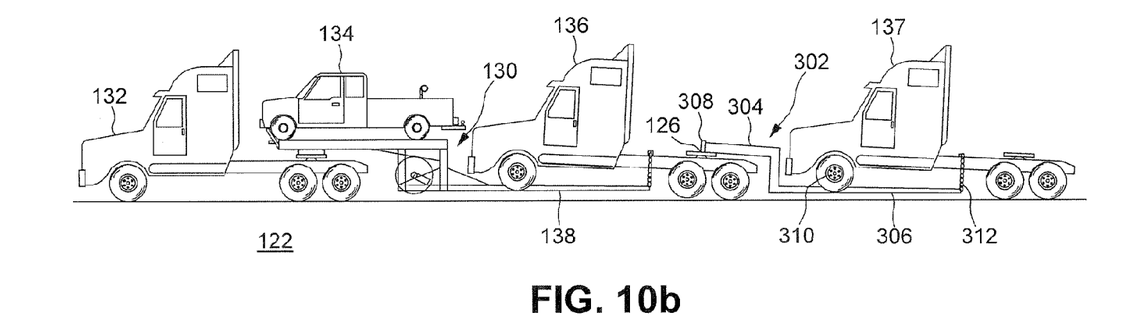
Figure 11A:
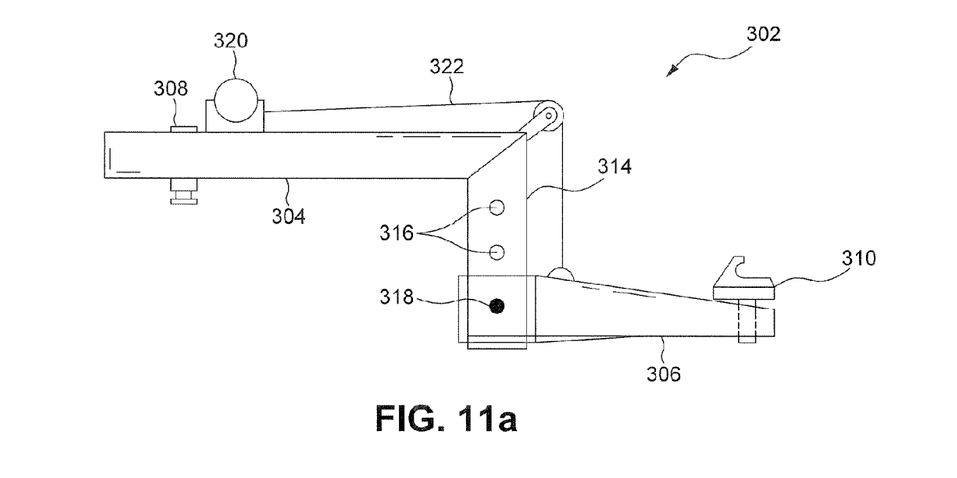
Figure 11B:
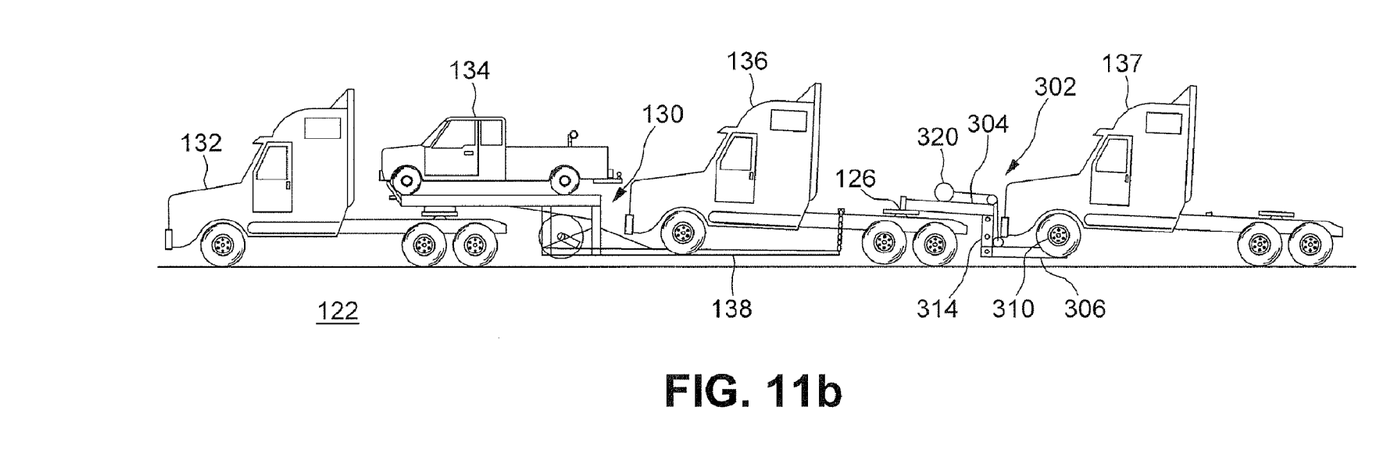
Figure 12:
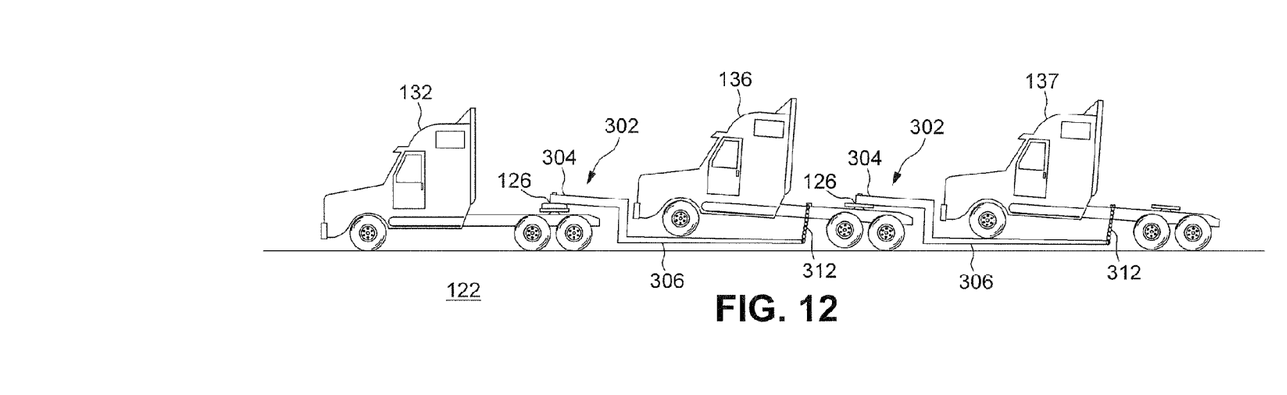
FIG. 12 illustrates low rider saddle mounts for use with a towing truck and towed trucks without using the universal folding boom trailer.

The present disclosure includes a low rider saddle mount 302. The low rider saddle mount 302 may be used with the universal folding boom trailer 130 as described hereinabove and in International Application No. PCT/US2007/070406 to Watkins. The low rider saddle mount 302 may be rigid as shown in FIGS. 10a and 10b, adjustable in height as shown in FIGS. 11a and 11b, or separable as shown in FIGS. 12a and 12b. It should be understood that other configurations, and combinations of the described configurations, are within the scope of the present disclosure.

Referring to FIGS. 10a and 10b, the low rider saddle mount 302 includes a first horizontal member 304 spaced vertically apart from a second horizontal member 306. The first and second horizontal members 304, 306 may be rigidly connected as shown in FIG. 10a such that the spacing therebetween is not adjustable. The first horizontal member 304 may be selectively coupled to one of the towing vehicle 132 and the towed second vehicle 136, as desired. For example, the first horizontal member 304 may have a first securing means 308 such as a fifth wheel kingpin for attachment to the fifth wheel 126 of one of the towing vehicle 132 and the second vehicle 136. The fifth wheel kingpin may be adjustable forward and aft, for example.

The second horizontal member 306 of the low rider saddle mount 302 may be selectively coupled to one of the second vehicle 136 and the third vehicle 137 such as a second semi tractor truck. As a nonlimiting example, the second horizontal member 306 may include a second securing means 310 such as a saddle mount axle connector for attachment to the front axle of one of the second vehicle 136 and the third vehicle 137. Alternatively, the second securing means 310 may include a pivoting axle mount such as shown in FIG. 11a, for example.

A third securing means 312 may also be provided on the second horizontal member 306 for removably coupling one of the second vehicle 136 and the third vehicle 137 to the rigid low rider saddle mount 302. As a nonlimiting example, the third securing means 312 may include a chain and frame connector, as is known in the art. The chain and frame connector may be disposed at an end of the second horizontal member 306. It should be appreciated that multiple rigid low rider saddle mounts 302 may be employed to facilitate the connecting of multiple additional third vehicles 137 for towing, as desired.

With reference to FIG. 10b, the low rider saddle mount 302 is shown in operation. The towing vehicle 132 may optionally be coupled to the universal folding boom trailer 130 in the unfolded position 200. In other embodiments, the low rider saddle mount 302 is coupled to the towing vehicle 132. As shown in FIG. 10b, the first vehicle 134 is disposed atop the unfolded universal folding boom trailer 130 and the first second vehicle 136 is coupled with the boom 138 of the universal folding boom trailer 130. The second vehicle 136 and the third vehicle 137 are each disposed facing forward for towing behind the towing vehicle 132. The rigid low rider saddle mount 302 is disposed between the first second vehicle 136 and the third vehicle 137.

Illustratively, the first securing means 308 of the rigid low rider saddle mount 302 may be coupled with the fifth wheel 126 of the second vehicle 136, the second securing means 310 may be coupled with the front axle of the third vehicle 137, and the third securing means 312 may be coupled with the frame of the third vehicle 137. The forward-facing transportation of the second and third vehicles 136, 37 may thusly be performed.

In a further embodiment, the low rider saddle mount 302 may be adjustable in height. As shown in FIGS. 11a and 11b, for example, the first and second horizontal members 304, 306 of the low rider saddle mount 302 may be adjustably spaced vertically apart from one another. The first and second horizontal members 304, 306 may be adjustably connected with a connecting member 314. The second horizontal member 306 may be vertically and slidably connected with the connecting member 314. The second horizontal member 306 may also be lockable to select positions on the connecting member 314, as desired. For example, the connecting member 314 may have a plurality of holes 316 formed therein, and the second horizontal member 306 may have a locking pin 318 configured to be received by each of the holes 316 for locking the second horizontal member 306 in a select position, as desired. It should be understood that the adjustable height low rider saddle mount 302 may facilitate the employment of the towing system of the present disclosure with a wide range of vehicles including, for example, box trucks, flatbeds, straight trucks, etc.

The placement of the second horizontal member 306 relative the first horizontal member 304 in the adjustable height low rider saddle mount 302 may be facilitated by a winch 320 as shown in FIG. 11a. The winch 320 may be disposed on the first horizontal member 304 and coupled to the second horizontal member 306 via a winch cable 322. The winch cable 322 may be disposed about a pulley 324 at an end of the first horizontal member 304 and connected to the second horizontal member 306 adjacent the connecting member 314. The pulling in of the cable 322 by the winch 320 thereby may cause a raising of the second horizontal member 306 relative the first horizontal member 304. Likewise, a letting out of the winch cable 322 by the winch 320 may cause a lowering of the second horizontal member 306 relative the first horizontal member 304.

As shown in FIG. 12, the low rider saddle mount 302 may be directly coupled to the towing vehicle 132, for example, at the fifth wheel 126 of the towing vehicle. The low rider saddle mounts 302 may be used without the universal folding boom trailer 130. In certain embodiments, the low rider saddle mount 302 may be directly coupled to the frame of the towing vehicle 132, and likewise directly coupled to the frames of connected towed second and third vehicles 136, 137. A plurality of the low rider saddle mount 302 may thereby be employed to tow multiple second and third vehicles 136, 137. It should be appreciated that the employment of multiple low rider saddle mounts 302, either rigid or adjustable, may facilitate the towing of the multiple second and third vehicles 136, 137 under bridges and through tunnels without having to remove stacks or wind fairings 184.

Figure 13A:
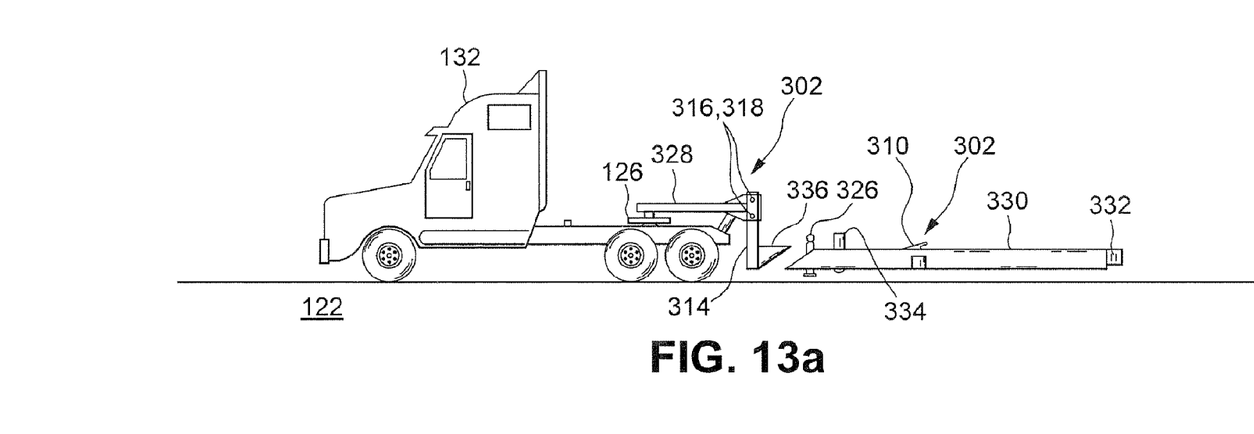
Figure 13B:
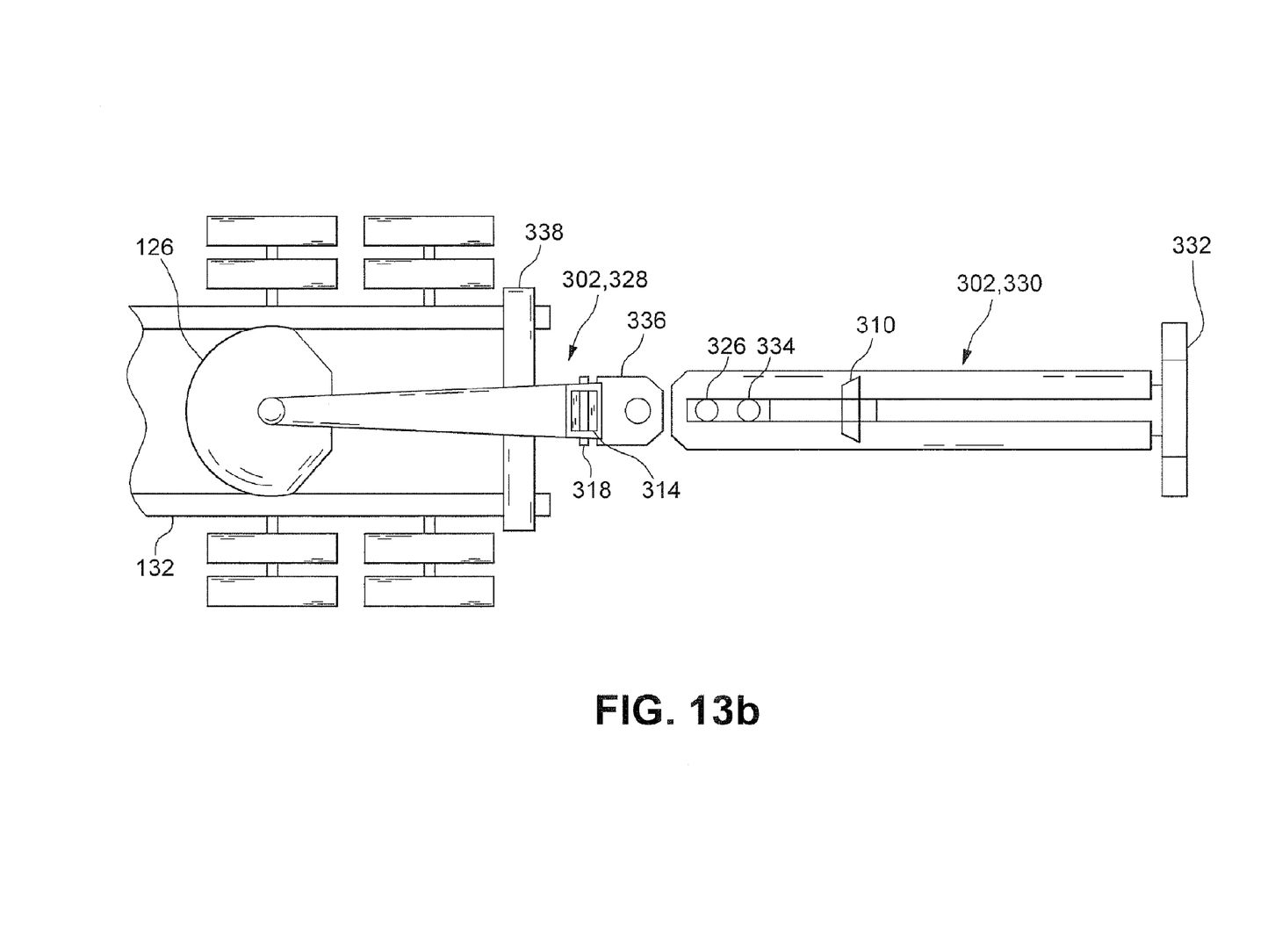

Referring now to FIGS. 13a to 13b, the low rider saddle mount 302 may be disconnected into separate pieces to make the low rider saddle mount 302 lighter for an operator to transport and assemble, and to place the pivoting point lower than with a unitary low rider saddle mount 302. For example, the low rider saddle mount may be disconnected at a king pin 326. In certain embodiments, the king pin 326 is a removable king pin 326. The separate pieces of the low rider saddle mount 302 may include a fifth wheel attachment bar 328 and a boom 330.

The boom 330 may have the securing means 310 such as the saddle mount axle connector for attachment to the front axle of one of the second vehicle 136 and the third vehicle 137, as desired. The boom 330 may further include a telescoping chain and frame connector 332, for example, for connecting to the frame of one of the second vehicle 136 and the third vehicle 137, as desired. In a further example, the boom 330 has a hydraulic jack 334. The hydraulic jack may be disposed between the king pine 326 and the securing means 310, for example. The telescoping chain and frame connector 332 and the hydraulic jack 334 may also be employed with the low rider saddle mount 302 in the rigid and adjustable configurations.

The fifth wheel attachment bar 328 is configured for attachment to the fifth wheel 126 of at least one of the towing vehicle 132, the second vehicle 136, and the third vehicle 137. The fifth wheel attachment bar 328 may include a king pin receiver 336 configured to receive the king pin 326 of the boom 330. The king pin receiver 336 may be rigid or adjustable in height as shown in FIG. 13a. Where the king pin receiver 336 is adjustable in height, the king pin receiver 336 may include the vertical member 314 slidably received by the first horizontal member 304. The first horizontal member 304 and the vertical member 314 may include holes 316 configured to receipt the locking pin 318 for securing holding the vertical member 314 at a desired position. A cross member support bar 338 may also be disposed between the fifth wheel attachment bar 328 and the frame of one of the towing vehicle 132, the second vehicle 136 and the third vehicle 137. In certain embodiments, the cross member support bar 338 may support and facilitate a connecting of the low rider saddle mount 302 directly to the frame.

The present disclosure further includes a method for transporting at least one of the first, second, and third vehicles 134, 136, 137 with the low rider saddle mount 302, and optionally the universal folding boom trailer 130. The method includes coupling the towing vehicle 132 with the second vehicle 136 via one of the universal folding boom trailer 130 and the low rider saddle mount 302 as described hereinabove. The method further includes the step of attaching the low rider saddle mount 302 to the second vehicle 136. The third vehicle 137 may then be pulled up and over the second horizontal member 306 of the low rider saddle mount 302. The third vehicle 137 may then be attached to the low rider saddle mount 302 as described herein. In particular embodiments, the method may include the step of adjusting the height of the low rider saddle mount 302, for example, depending on the type of the second and third vehicles 136, 137 to be towed. The method may also include repeating the abovementioned steps for towing of more than the second and third vehicles 136, 137, for example, up to a legally allowed length or amount of vehicles to be towed.

The method of the present disclosure may further include the step of loading the first vehicle 134, such as the driver's personal vehicle, atop the universal folding boom trailer 130 in the forward facing position. The step of loading the first vehicle 134 may be performed prior to the step of loading the second vehicle 136 atop the universal folding boom trailer 130 in the forward facing position.

In a particular embodiment, the present method may include the steps of: securing the universal folding boom trailer 130 to the towing vehicle 132 prior to the step of rotating the boom 138 to the unfolded position 200. The boom 138 may then be rotated to the crane position 300, locked in place, and the second and third vehicles 136, 137 towed in the forward facing positions with the boom 138 in the crane position 300. The second vehicle 136 is thereby prepared for loading atop the universal folding boom trailer 130 when the boom 138 is rotated to the unfolded position 200.

It should be understood that the method of the present disclosure may include sequentially loading additional vehicles (not shown) in forward towing positions onto the third vehicle 137 until the maximum legal towing length is reached.

Following the transportation of the optional first vehicle 134, second vehicle 136, and third vehicle 137 to a desired location, the towing vehicle 132 and the second vehicle 136 may be disconnected from at least one of the universal folding boom trailer 130 and the low rider saddle mount 302. The universal folding boom trailer 130 may be employed to disconnect the second and third vehicles 136, 137. For example, the boom 138 may be rotated into the crane position 300, and the second and third vehicle 136, 137 disconnected by hoisting the second and third vehicles 136, 137 about the boom 138. Following the disconnecting of the second and third vehicles 136, 137, the universal folding boom trailer 130 may be trailered to the first vehicle 134 for transport by rotating the boom 138 back to the folded position 200, whereby the universal folding boom trailer 130 is turned into the solitary trailer.

It should be appreciated that the method using the universal low rider saddle mount 302 according to the present disclosure lowers the second and third vehicles 136, 137 so that the front tires are approximately 9 inches from the ground instead of the 3 or 4 feet off the ground in the methods known in the art. This allows the second and third vehicles 136, 137 to be delivered in the forward facing position and lower to the ground. It should be further appreciated that the second and third vehicles 136, 137 according to the present disclosure can advantageously pass under bridges and through tunnels without having to remove stacks or air fairings. The second and third vehicles 136, 137 are also legal to tow and deliver throughout the United States and many other countries. Being forward towed, the system and method of the present invention further allows for a more fuel-efficient towing of at least one of the first, second and third vehicles 134, 136, 137 than is known in the art.

While certain representative embodiments and details have been shown for purposes of illustrating the invention, it will be apparent to those skilled in the art that various changes may be made without departing from the scope of the disclosure, which is further described in the following appended claims.

What is claimed is:

1. A system for towing multiple vehicles, comprising:
   a low rider saddle mount having:
   a first horizontal member selectively coupled to one of a towing vehicle and a second vehicle;
   a second horizontal member selectively coupled to one of the second vehicle when the first horizontal member is coupled to the towing vehicle and a third vehicle when the first horizontal member is coupled to the second vehicle, the second horizontal member vertically spaced apart from the first horizontal member and oriented substantially parallel with the first horizontal member;
   a connecting member connecting the first horizontal member and the second horizontal member, the connecting member coupled to an end of the first horizontal member, the second horizontal member having an opening at an end of the second horizontal member through which the connecting member is slidably disposed, the first and second horizontal members adjustably vertically spaced apart from one another by slidable movement of the second horizontal member on the connecting member, the orientation of the first horizontal member relative to the second horizontal member remaining the same during the selective movement of the second horizontal member on the connecting member; and
   a winch disposed on the first horizontal member, the winch connected to the second horizontal member by a winch cable disposed about a pulley located above the second horizontal member and adjacent an end of the first horizontal member, the winch cable connected to the second horizontal member at a position adjacent the connecting member, the connecting member including a plurality of holes and the second horizontal member including a locking pin, the second horizontal member further including an aperture in communication with the opening, the locking pin configured to be received by the aperture of the second horizontal member and each of the holes of the connecting member for selectively locking the second horizontal member in a desired position,
   wherein the multiple vehicles are towed in a forward direction.

2. The system of claim 1, wherein the low rider saddle mount includes a first securing means disposed on the first horizontal member, the first securing means configured for attachment to a fifth wheel of the second vehicle.

3. The system of claim 2, wherein the low rider saddle mount includes a second securing means disposed on the second horizontal member, the second securing means configured for attachment to a front axle of the third vehicle.

4. The system of claim 3, wherein the second securing means is a saddle mount axle connector.

5. The system of claim 4, wherein the saddle mount axle connector is configured to pivot.

6. The system of claim 3, wherein the low rider saddle mount includes a third securing means disposed on the second horizontal member, the third securing means configured for attachment to a frame of the third vehicle.

7. The system of claim 6, wherein the third securing means is a chain and frame connector disposed at an end of the second horizontal member.

8. The system of claim 2, wherein the first securing means is a fifth wheel kingpin that is adjustable forward and aft along the first horizontal member.

9. A system for towing multiple vehicles, comprising:
   a universal folding boom trailer having a rotatable boom for supporting a first vehicle and a second vehicle upon the boom trailer, the universal folding boom trailer further including a first means for securing the universal folding boom trailer to a towing vehicle; and
   a low rider saddle mount having:
   a first horizontal member selectively coupled to one of a towing vehicle and a second vehicle;
   a second horizontal member selectively coupled to one of the second vehicle when the first horizontal member is coupled to the towing vehicle and a third vehicle when the first horizontal member is coupled to the second vehicle, the second horizontal member vertically spaced apart from the first horizontal member and oriented substantially parallel with the first horizontal member;
   a connecting member connecting the first horizontal member and the second horizontal member, the connecting member coupled to an end of the first horizontal member, the second horizontal member having an opening at an end of the second horizontal member through which the connecting member is slidably disposed, the first and second horizontal members adjustably vertically spaced apart from one another by slidable movement of the second horizontal member on the connecting member, the orientation of the first horizontal member relative to the second horizontal member remaining the same during the selective movement of the second horizontal member on the connecting member; and
   a winch disposed on the first horizontal member, the winch connected to the second horizontal member by a winch cable disposed about a pulley located above the second horizontal member and adjacent an end of the first horizontal member, the winch cable connected to the second horizontal member at a position adjacent the connecting member, the connecting member including a plurality of holes and the second horizontal member including a locking pin, the second horizontal member further including an aperture in communication with the opening, the locking pin configured to be received by the aperture of the second horizontal member and each of the holes of the connecting member for selectively locking the second horizontal member in a desired position,
   wherein the multiple vehicles are towed in a forward direction.

\* \* \* \* \*